Oct. 28, 1958  E. A. WAHL  2,857,938
POWDER-FILLING MACHINE
Filed Oct. 27, 1953  10 Sheets-Sheet 1

Inventor:
Eugene A. Wahl
By Gaylor, Cifelli & Jurick
Attorneys.

Oct. 28, 1958 E. A. WAHL 2,857,938
POWDER-FILLING MACHINE
Filed Oct. 27, 1953 10 Sheets-Sheet 4

Fig. 4

Inventor:
Eugene A. Wahl
By Gaylor, Cifelli & Jurick
Attorneys.

Oct. 28, 1958 E. A. WAHL 2,857,938
POWDER-FILLING MACHINE
Filed Oct. 27, 1953 10 Sheets-Sheet 7

United States Patent Office 2,857,938
Patented Oct. 28, 1958

2,857,938
POWDER-FILLING MACHINE
Eugene A. Wahl, Glen Ridge, N. J.
Application October 27, 1953, Serial No. 388,543
17 Claims. (Cl. 141—71)

This invention relates to a bottle-filling machine and more particularly to a novel machine for automatically filling bottles with a measured amount of powder at a relatively high rate of speed and accuracy.

Various automatic powder filling machines have been provided heretofore. However, such prior machines are of complex construction, operate unreliably and at a relatively slow speed and the amount of powder fed into a plurality of bottles varies considerably. Further, such machines are not adapted to the filling of powders of widely different flow characteristics, i. e. free flowing granular dry powder, and sticky amorphous powder. They are also not readily adjusted to compensate for the greatly varying densities found in powders of even the same composition; nor is the adjustment for changing the measured amount easily accomplished. Still further, and importantly from a practical standpoint, the prior machines are not readily converted for operation with bottles of a different size and are not capable of convenient dismantling and reassembly, by unskilled help, for purposes of periodic sterilization as is required particularly in the pharmaceutical field.

The majority of machines heretofore employed for powder-filling include a rotating auger, the rate of powder movement being controlled by the auger speed. In such arrangement, a sticky powder will adhere to the auger thereby variably reducing the quantity of powder fed into the bottle. On the other hand, free-flowing, granular powder tends to over-run the auger when the latter is disposed in the customary, vertical position. Other machines involve the use of differential air pressure wherein the powder is drawn into a measuring chamber having a screen bottom. In these machines the screens become progressively clogged thereby resulting in serious volume variations. Further, the latter type machines are not adjustable over a wide operating range and are of a complexity requiring excessive maintenance. In both cases the machines are not accurate for precision powder-filling and are unsuited for filling small bottles with small quantities of powder, say 20 milligrams.

It is the primary object of this invention to provide an automatic powder-filling machine which overcomes the above-mentioned difficulties inherent in machines now available or heretofore proposed.

My machine, while capable of general use, is particularly designed for the precise filling of relatively small bottles or vials with very fine powders of the pharmaceutical class. I accomplish this by providing a vibration-producing means that supports a hopper and a plurality of associated measuring chambers. Simple valve means alternately control the supply of powder from the hopper to the measuring chambers and the discharge of the powder from the measuring chambers into a plurality of bottles positioned therebelow. Automatic timing means are provided to control the vibration of the hopper and measuring chambers, the operation of the valve means, and the movement of the bottles to and from the filling stations. The timing means assures a predetermined vibration period whereby the powder in the measuring chambers is compacted to the same degree for each bottle-filling cycle thereby assuring a uniform quantity of powder in each bottle. Various adjustment means are provided whereby the machine may readily be conditioned for operation with bottles of another size and for changing the volume of the measuring chambers to increase or decrease the amount of powder fed into a given series of bottles. Additionally, my machine is of simple, rugged construction and those parts which must be sterilized periodically, as for example, each day in the pharmaceutical industry, are adapted for easy dismantling and reassembly.

An object of this invention is the provision of an automatic powder-filling machine of simple, straight forward design, rugged construction, of positive, high operating speed and one having a degree of operating precision exceeding that available in prior machines of this class.

An object of this invention is the provision of an automatic machine for filling bottles with powder and comprising a storage hopper for the powder, an adjustable measuring chamber communicating with the hopper, a slide valve member controlling the discharge of powder from the hopper into the measuring chamber, valve means controlling the discharge of powder from the measuring chamber into a bottle, electro-magnetic means to vibrate the hopper and measuring chamber and means controlling the operation of the electro-magnetic means and the alternate operation of the slide valve and valve means.

An object of this invention is the provision of an automatic machine for filling bottles with powder and comprising a hopper, a plurality of measuring chambers having a predetermined volume, means to feed powder from the hopper to the measuring chambers in a manner such that the powder is always compacted to a constant degree, means to feed a plurality of bottles into bottle-filling association with the measuring chambers, means controlling the discharge of the powder from the measuring chambers into the bottles and automatic means to remove the filled bottles.

An object of this invention is the provision of an automatic machine for filling bottles with powder comprising a storage hopper in communicating relation with a measuring chamber of predetermined, adjustable volume, means effective to open and close the hopper with respect to the chamber, means to feed a bottle into bottle-filling registry with a discharge opening in the chamber, means controlling the discharge of powder from the chamber into the bottle, means to move the filled bottle out of registry with the discharge opening in the chamber, mechanical-vibration-producing means, and means securing the hopper and chamber to the vibration-producing means, the flow of powder from the hopper into the measuring chamber and from the measuring chamber into the bottle being effected by the mechanical vibrations imparted to the hopper and chamber by the said vibration-producing means.

An object of this invention is the provision of an automatic powder-filling machine comprising a housing, a conveyor belt carried by the housing, means for setting a plurality of bottles in upright, spaced position on the conveyor belt, a super-structure disposed over and carried by the housing, a powder-storage hopper carried by the super-structure, a plurality of measuring chambers of predetermined and variable volume disposed under the hopper and communicating therewith, each measuring chamber having a discharge opening alined with a bottle, a slide valve operable to close-off the hopper from the measuring chambers, gate means operable to close off the discharge openings of the measuring chambers, electro-magnetic means for vibrating the super-structure, means for energizing the electro-magnetic means for a predetermined period of time, cyclic control means for alternately operating the slide valve and gate means, and means for imparting movement to the belt after the powder is discharged from the measuring chambers.

An object of this invention is the provision of an automatic powder-filling machine comprising a housing supporting a conveyor belt, an electro-magnetic vibrator supported by the housing, a super-structure supported by the vibrator, a storage hopper for powder carried by the super-structure and including an inclined base, a plurality of measuring chambers of predetermined volume carried by the super-structure and communicating with the hopper, said chambers having individual discharge openings, a slide plate slidable along an inclined base of the hopper and effective to open and close the measuring chambers with respect to the hopper, fluid-pressure operated means carried by the super-structure and controlling the position of the said slide plate, a second fluid-pressure operated means carried by the super-structure and adapted to raise or lower the measuring chambers with respect to the hopper, means effective when the measuring chambers are in the raised position to close-off the discharge openings thereof, means for positioning a plurality of bottles on the belt each bottle having its open end alined with a discharge opening of one of the measuring chambers, means effective when the measuring chambers are in the lowered position to discharge powder from the measuring chambers into the bottles, means for energizing the electro-magnetic means at least during that portion of the machine-operating cycle when powder is discharged into and out of the measuring chambers, and means to impart movement to the belt after the powder is discharged from the measuring chambers.

An object of this invention is the provision of apparatus for use on automatic powder-filling machines, said apparatus comprising a rigid member supported by mechanical vibration-producing means, a hopper carried by the rigid member and provided with an opening communicating with a measuring chamber having a discharge opening, closure means for closing and opening the said opening in the hopper, means for raising and lowering the lower part of the measuring chamber, means effective when the said lower part of the chamber is raised to close the discharge opening thereof and effective when such part of the chamber is lowered to open the discharge opening thereof, and means controlling said closure means so that the hopper opening is open and closed when the measuring chamber is in the raised and lowered positions, respectively.

These and other objects and advantages will become apparent from the following description when taken with the accompanying drawings illustrating the construction and operating principles of my automatic powder-filling machine. It will be understood the drawings are for purposes of illustration and are not to be construed as defining the scope or limits of the invention, reference being had for the latter purpose to the appended claims.

In the drawings wherein like reference characters denote like parts in the several views.

Figures 1, 19, 20, 21, 22:
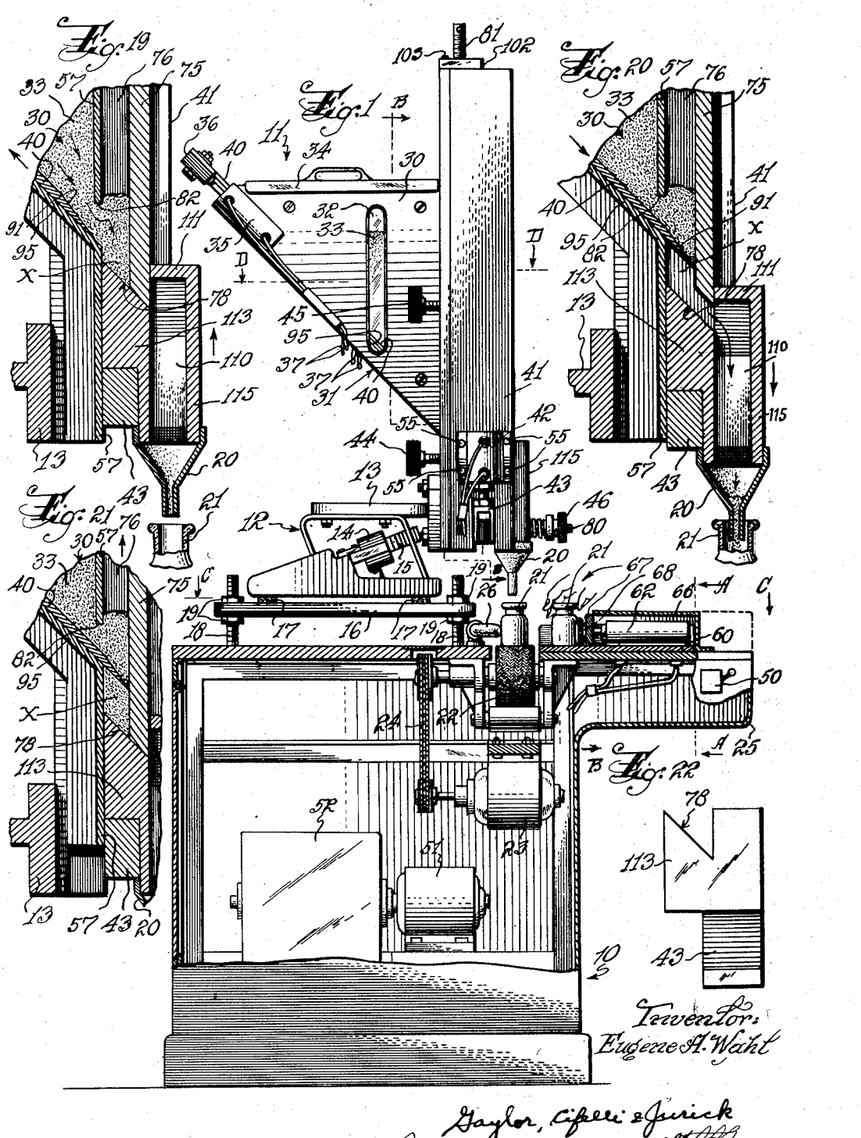
Figure 1 is a side elevation of the machine with parts in section.
Figure 19 is a fragmentary, transverse sectional view of the lower portion of the super-structure and showing the flow of powder from the storage hopper into a measuring chamber.
Figure 20 is a similar view showing the discharge of the powder from a measuring chamber into a bottle.
Figure 21 is a similar view showing the coacting parts adjusted to provide a measuring chamber of increased capacity.
Figure 22 is an end view of the funnel and bottom gate assembly.

Reference is now made to Figure 1 showing the base member 10, forming a substantially closed housing for the lower portion of the machine, and the super-structure 11 supported on the base by a vibration-producing device 12. It is here pointed out that the super-structure is secured rigidly to the vibration-producing member by a plate 13 and suitable bolts and nuts as shown. The vibration-producing member, which includes an electrical solenoid 14 and an armature 15, is secured to a mounting plate 16 by vibration mountings 17. The mounting plate 16 is, in turn, secured to the base member by cooperating bolts and nuts 18 and 19 from which it will be apparent that the entire super-structure may be raised and lowered with respect to the base member by a suitable adjustment of the nuts 19. As will become more apparent hereinbelow such vertical adjustment of the super-structure with respect to the base member alters the spacing between the funnel 20 and the bottle 21 that is shown disposed under the funnel in the bottle-filling position. A plurality of bottles are spaced along the conveyor belt 22 and in registry with the corresponding funnels, said conveyor belt being driven by a motor 23 coupled to the belt pulley by a chain drive 24. In operation, the bottles are stationary during the bottle filling operation and thereafter are automatically moved out of range of the funnels to, say, a bottle capping machine, the time of such bottle movement being controlled by a timing cam as will be described in detail hereinbelow.

A more detailed description of the arrangement for feeding the bottles on to the conveyor belt will be described with specific reference to Figures 4 and 5. For the moment suffice to say that the horizontal extension or ledge 25, forming a portion of the base member, supports a suitable rack that extends along the length of the machine. Such rack is provided with a series of compartments corresponding to the number of funnels and the operator places a bottle into each such compartment. Having so filled the rack compartments with bottles the operator then slides the rack toward the funnels whereby the bottles are transferred on to the conveyor belt. A suitable bumper rail, or stop, 26, preferably made of somewhat resilient material, defines the limit of movement of the bottles when the rack is moved forward and when the rack is withdrawn to its initial position the bottles remain on the conveyor belt, each bottle ready to receive powder discharged from the associated funnel.

The super-structure includes a storage hopper 30 having an inclined base 31 and provided with windows 32 through which the level of the contained powder 33 may be ascertained without removing the hopper cover 34. The super-structure also includes a plurality of measuring chambers adapted for communication with the hopper, each chamber carrying a funnel such as the funnel 20 visible in Figure 1; the specific construction of such measuring chambers being illustrated in Figure 6 to be described in detail hereinbelow. The side walls of the hopper support a pair of air cylinders such as the cylinder 35 visible in Figure 1. These cylinders have pistons connected to a crossbar 36 whereby said crossbar is moved to one of two positions in response to air pressure fed to the cylinders through suitable connecting hoses 37. The air cylinders are of the conventional two-way type whereby air pressure admitted into one of the hoses will force the crossbar outwardly relative to the hopper and air pressure admitted into the other hose will move the crossbar inwardly relative to the hopper. Such movement of the crossbar controls the position of a slide plate 40 that serves as the means for closing and opening the hopper with respect to the measuring chambers, as will be described in detail hereinbelow with specific reference to Figure 6. Mounted on the vertical frame 41 of the super-structure are another pair of air cylinders, such as the cylinder 42 visible in Figure 1, and which cylinders have pistons connected to another crossbar 43. This cross bar, which extends along the entire front of the super-structure, is solid and of generally rectangular cross section throughout substantially its entire length; the ends of the cross bar being channeled (see Figure 17) to facilitate attachment of the cross bar to the pistons of the air cylinders. These cylinders are likewise of the two-way type and control the lowering and raising of the crossbar 43 at the proper point in the operating cycle of the machine. The raising and lowering of the crossbar 43 controls the discharge of the powder from the measuring chamber through the funnels and into the bottles as will be described in detail hereinbelow with reference to Figure 6. Suitable thumb screws 44, 45 serve to secure the hopper and measuring chambers to the super-structure side frame 41 thereby facilitating the dismantling of these parts for purposes of periodic sterilization. The thumb screws 46 secure the funnel assembly to the crossbar 43.

Having now given an overall description of the machine as shown in Figure 1, it appears desirable to point out the operating cycle of the machine before proceeding to a more detailed description of the construction of the various parts making up the numerous assemblies. Assuming the hopper has been filled substantially with the powdered material and that a plurality of bottles are positioned on the conveyor belt, in the bottle-filling position, the operator starts the machine by closure of a readily-accessible electrical switch 50. The closure of the switch 50 energizes a motor 51 which drives a suitable timing mechanism enclosed within the housing 52. Such timing mechanism controls the entire operating cycle of the machine which, briefly, is as follows:

(1) The electro-magnetic vibrator 12 vibrates the entire super-structure;

(2) The air cylinders 35 operate to raise the slide plate 40 outwardly of the hopper whereby powder is fed from the hopper into the measuring chambers;

(3) The air cylinders 35 operate to close the hopper with respect to the measuring chambers;

(4) The air cylinders 42 lower the funnels into the bottles and the powder from the measuring chamber is simultaneously discharged into the bottles;

(5) The air cylinders 42 operate to raise the funnels and thereby simultaneously close off the discharge opening of the measuring chambers;

(6) The motor 23 is energized and the conveyor belt moves the bottles to the next station out of range of all the funnels;

(7) The air cylinders 35 operate to open the hopper with respect to the measuring chambers whereby such chambers are again filled with the powder;

(8) The operator slides the loading rack forwardly so as to feed another series of bottles under the funnels, the operator having filled the loading rack with bottles while the machine has been going through the above operating cycle.

Movement of the powder from the hopper into the measuring chambers and from the latter through the funnels into the bottles is accomplished by vibration, it being noted that the entire super-structure is supported by the vibration-producing means. The amplitude of the vibration is such that the powder is caused to flow freely and uniformly from the hopper into the measuring chambers. Further, and importantly, the absolute timing of the slide plate which closes off the hopper from the measuring chambers and the time period during which the measuring chambers are being supplied with powder from the hopper assures a uniform compacting of the powder within the measuring chambers for each operating cycle of the machine. This, together with the fact that the measuring chambers each have a precise volumetric capacity, results in a uniform quantity of powder fed into the bottles.

Figure 2:
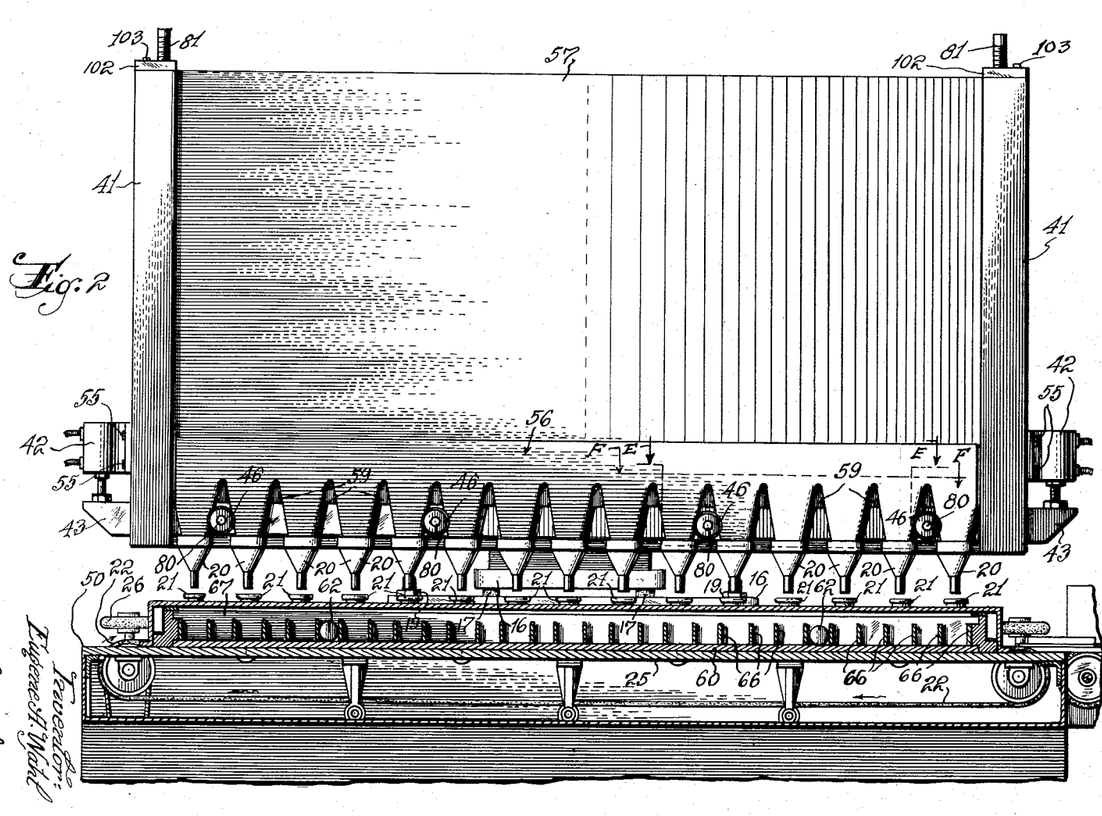
Figure 2 is a sectional view taken along the line A—A of Figure 1 and showing, essentially, the front of the machine.

Reference is now made to Figure 2 which is a longitudinal sectional view taken along the line A—A of Figure 1. The super-structure which, obviously, is set back from the ledge supporting the bottle-loading rack, is here shown in elevation. While I show the entire super-structure supported by the single vibration-producing means resting on the mounting plate 16 it is apparent that two or more of such vibration-producing mechanisms may be employed. The side frames 41 of the super-structure carry the air cylinders 42, the latter being secured thereto by the screws 55. The pistons of the air cylinders are attached to the channeled ends of the crossbar 43 which crossbar has secured thereto the entire funnel and bottom gate assembly generally identified by the numeral 56. Such funnel and bottom gate assembly spans the space between the frames 41 and constitutes an element separate from the front wall 57 of the hopper. The threaded rods 80, carrying the thumb screws 46, are secured to and extend laterally forward from the crossbar 43 and are disposed within the triangular spaces 59 formed in the assembly 56. It will be apparent that when the pistons of the air cylinders 42 are moved downwardly under air pressure the crossbar 43 and the laterally-extending, threaded rods 80 are moved downwardly causing the entire assembly 56, including the funnels 20, to be lowered. The amount of downward movement of the assembly 56 is predetermined so that the tip of the funnels 20 will enter into the bottles 21 when the air cylinder pistons reach the limit of their downward travel. It is here pointed out that when the funnels are so lowered into the bottles the powder is emptied from the individual measuring chambers into the bottles, as will be described more specifically hereinbelow. As was described with reference to Figure 1, the ledge 50 of the base member 10 supports the bottle-loading rack. This rack comprises a base 60 having a plurality of parallel spaced partitions 66 forming chambers individually alined with the numerous funnels 20. A pair of air cylinders 62 are arranged to move the bottles in a plane normal to that of the funnels 20. Reference is made for the moment to Figure 5 which better illustrates the partitions 66 and the air cylinders 62. The pistons of the air cylinders 62 are attached to a back rail 67 carrying the resilient V-shaped pads 68. During operation of the machine the operator loads the bottles 21 into the rack compartments provided with such pads. At the proper point in the machine operating cycle air under pressure is admitted to the air cylinders 62 which drives the entire back rail 67 forwardly thereby moving the bottles on to the conveyor belt 22 and into registry with the individual funnels. Figure 2 clearly shows the resilient bumper rail 26 which serves as a stop to assure the proper transverse alinement of each bottle with its associated funnel.

Figure 3:
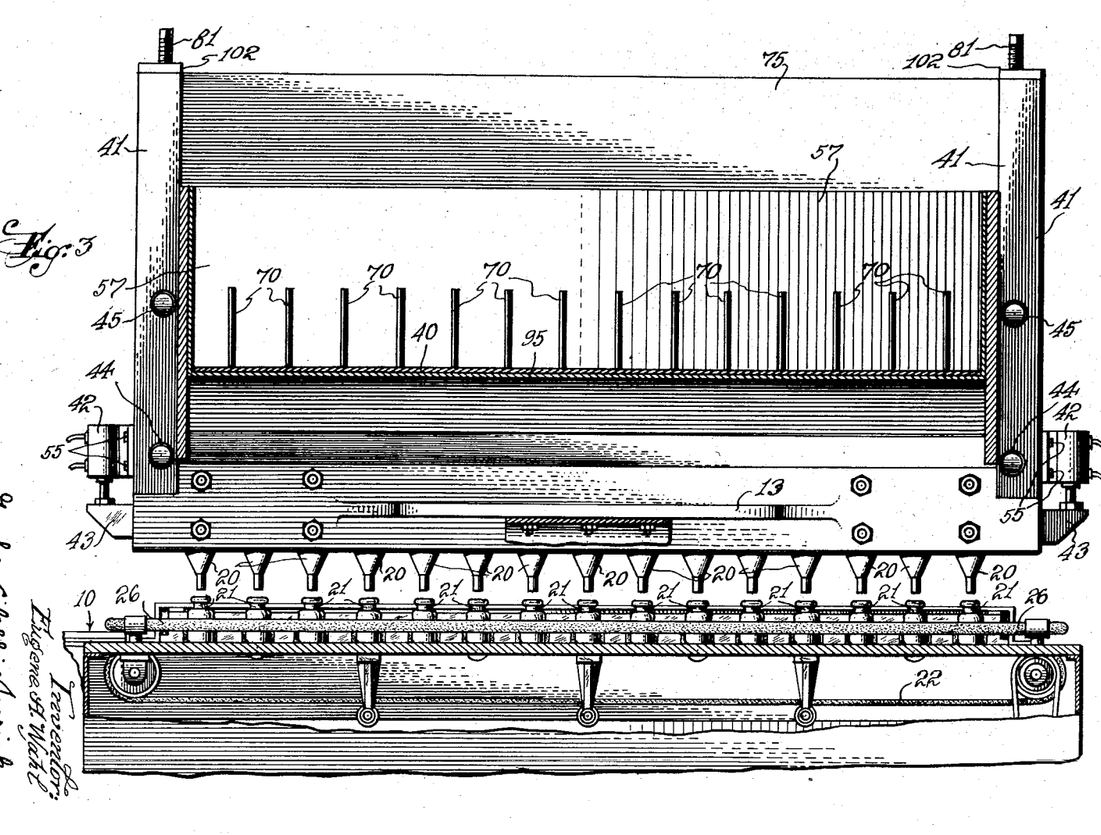
Figure 3 is a sectional view taken along the line B—B of Figure 1.

Reference is now made to Figure 3 which is a longitudinal sectional view taken along the line B—B of Figure 1 and therefore presents the machine as it appears from the rear. The bottles 21 are shown against the bumper rail 26 and alined with the associated funnels 20. Inasmuch as the bottles are in position to be filled with powder discharged through the funnels, it will be clear that at this point in the machine operating cycle the conveyor belt 22 is stationary. After the bottle-filling cycle has been completed, the timing mechanism closes a suitable switch which results in a movement of the belt whereby the bottles are moved from their illustrated position to another station such as, for example, a bottle capping machine. It will be noted that the sectional line through which Figure 3 has been taken, namely, line B—B of Figure 1, extends through the hopper at a point close to the side frames 41 of the super-structure. Consequently, Figure 3 shows a plurality of partition walls 70 attached to and extending downwardly from the front wall 57 of the hopper. These partitions serve to hold down the slide plate 40 against the hopper bottom. A clear understanding of this construction may be had by immediate reference to Figures 14 and 15 which clearly show the partitions 70 extending rearwardly from the front wall 57 of the hopper.

Figure 4:
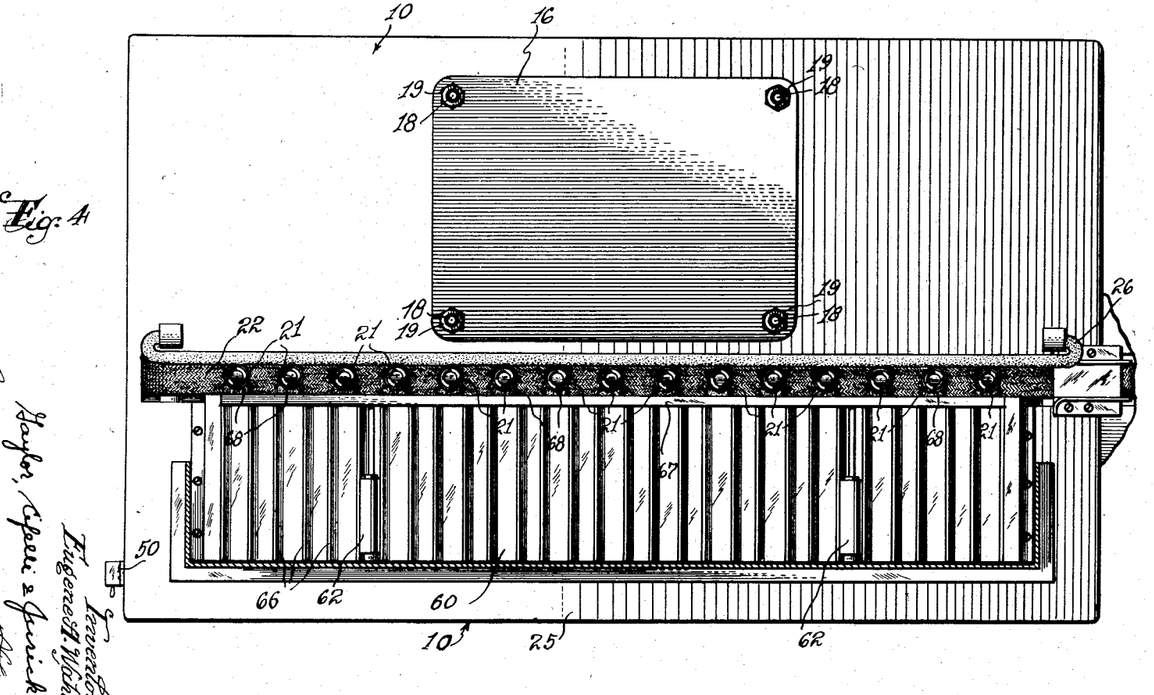
Figure 4 is a horizontal sectional view taken along the line C—C of Figure 1.
Figure 5:
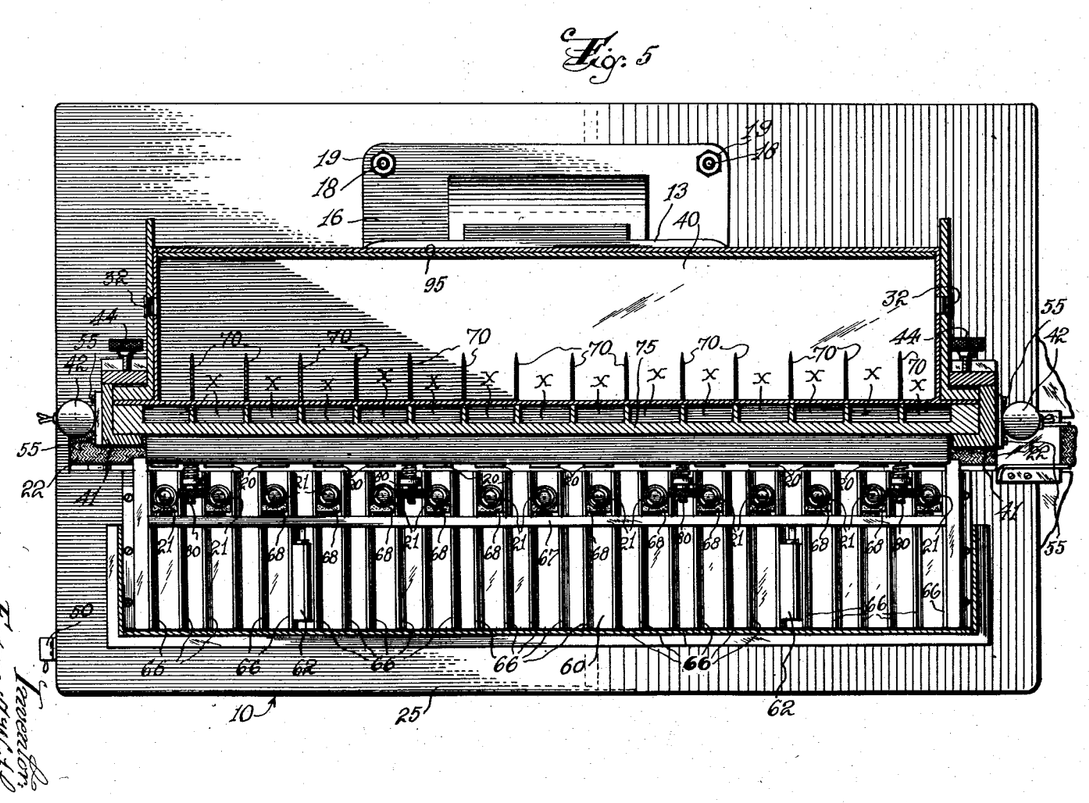
Figure 5 is a horizontal sectional view taken along the line D—D of Figure 1.

Reference is now made to Figure 4 which is a horizontal sectional view taken along the line C—C of Figure 1. This view clearly shows the mounting plate 16 which supports the vibration-producing member and the resilient bumper rail 26 which serves as a stop for the bottles 21 when the air cylinders 62 move the back rail 67 of the loading rack toward the funnels to thereby position the bottles on the conveyor belt 22. Whereas, in the Figure 5 view the bottles 21 are shown in the positions when the loading rack has just been loaded, Figure 4 shows the rack advanced with the bottles disposed on the belt and in the bottle-filling position.

Figures 6, 18:
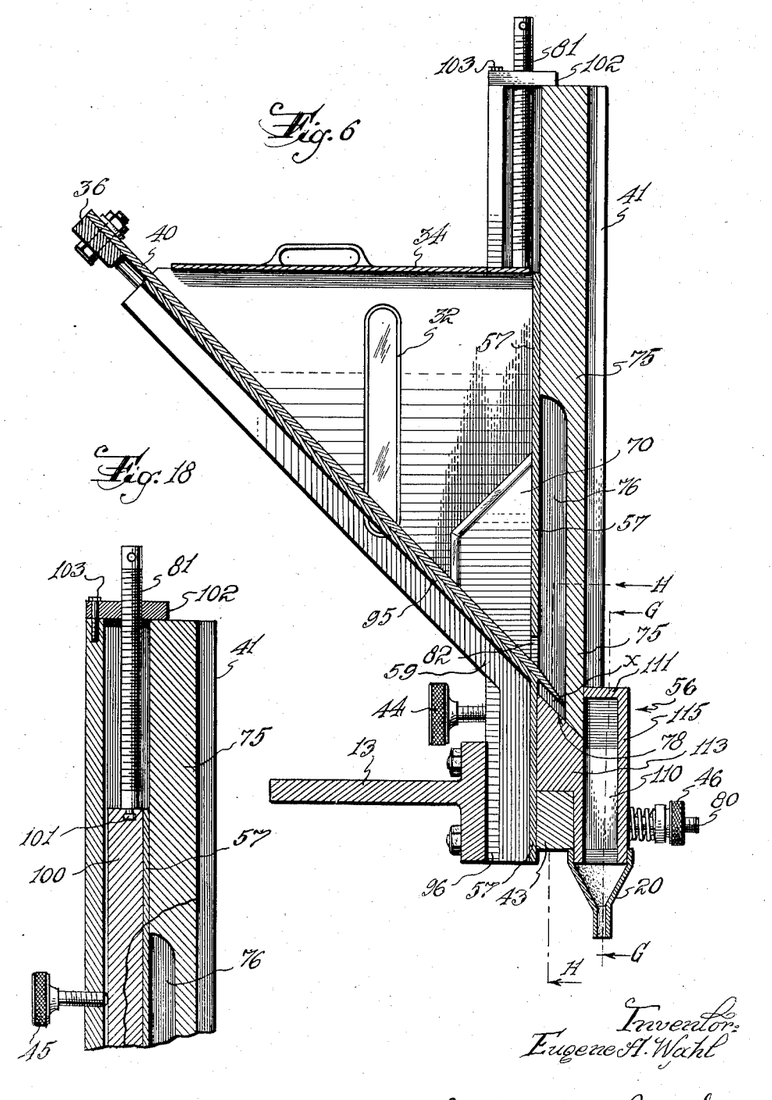
Figure 6 is a transverse sectional view of the super-structure, including the storage hopper and measuring chamber assembly, and drawn to an enlarged scale.
Figure 18 is a fragmentary cross sectional view, drawn to an enlarged scale, showing the arrangement for adjusting the volumetric capacity of the measuring chambers.

Reference is now made to Figure 6 which is a transverse, vertical section taken through the super-structure and drawn to an enlarged scale. Here is shown the tie plate 13 secured to the super-structure, which tie plate supports the entire super-structure on the vibration-producing member. Also shown is one of the partitions 70 extending from the front wall 57 of the hopper. The slide plate 40, having a knife edge end, is secured to the crossbar 36, said crossbar being connected to the pistons of the air cylinders 35, see also Figure 1. Consequently, the slide plate 40 is movable along the sloping bottom wall 31 of the hopper so that the knife edges are either abutting the base of the channel 76 formed in the surface of the vertical member 75, as shown, or are spaced therefrom. The vertical member 75 forms, essentially, the main portion of the measuring chambers and is clearly shown in Figure 12. This member may be made of a single piece of material with the various channels 76 milled therein or may be made up of separate pieces. Its main function is to form the vertical walls for the measuring chambers and such member is secured in fixed position relative to the frames 41 of the super-structure. The channels 76 are adapted to be alined with the similar channels 77 formed in the funnel and bottom gate assembly 56, the latter being shown in Figure 13 and having already been referred to in connection with Figure 2. Having here referred to Figure 13, it is well to call attention to the fact that the funnel and bottom gate assembly 56 may be made out of a plurality of individual parts secured together to form a unitary assembly. More specifically, the member 56 is adapted to be raised and lowered as a unit at the proper time in the operating cycle of the machine. It is also to be noted that the rear portion of the assembly 56 includes an inclined surface 78 having a slope corresponding precisely to that of the sloping bottom end of the vertical member 75. Referring back to Figure 6, it will be noted that the inclined surface 78, just mentioned, of the funnel and bottom gate assembly 56, conforms to the plane of the slide plate 40 and is spaced somewhat below the knife edge of the slide plate. The funnel and bottom gate assembly 56 is secured to the channeled crossbar 43 by spring-backed thumb nuts 46 operating on the bolts 80. Thus, when the crossbar is lowered the entire assembly 56 moves downwardly to increase the space between the knife edge of the slide plate 40 and the inclined surface 78 of the assembly 56. On the other hand, the vertical member 75, having the channels 76 therein, remains stationary at all times. Adjustment screws 81 (see also Figure 2) move the entire hopper up or down relative to the vertical member 75 and the sloping surface 78 of the horizontal bar 113. The specific arrangement for accomplishing this will be described hereinbelow with specific reference to Figure 18 but I here wish to point out that the purpose of the adjustable positioning of the hopper relative to the sloping surface 78 of the bar 113 is to change the volumetric capacity of the measuring chambers. The end frames of the super-structure are channeled and the entire assembly of the hopper and measuring chambers is secured in proper position within such channels by means of the thumb screws 44. It is believed such assembly is apparent from Figure 6. The end frame 41 has a U-shaped cross and the vertical, co-planar, forward surfaces of the vertical member 75 and the horizontal bar 113 abut against the inner surface of one leg forming the U-shaped end frame. The lower end of the other leg 96 of the end frame is rigidly secured to the tie bar 13 and the lower portion of the hopper assembly is disposed between such leg 96 and members 75 and 113. Each of the knurled thumb screws 46 operate in threaded holes in the leg 96 and have ends pressing against the relatively heavy angled frame 59 that supports the hopper. Thus, when these thumb screws are loosened slightly the entire hopper assembly may be moved up or down relative to the bar 113 and vertical member 75 thereby varying the volume of the chamber X. Once the hopper is positioned properly, the thumb screws are tightened and the hopper thereafter remains stationary relative to the vertical member 75 and is subject only to vibrational movement as a part of the super-structure. On the other hand, the assembly 56, comprising the funnel and lower gate mechanism, is movable up and down by the crossbar 43 as the latter is moved to one position or the other by the associated air cylinders. The vertical member 75, provided with the channels 76, which is rigidly clamped to the end frames also remains stationary relative to the hopper except for vibrational movement as a part of the super-structure.

The assembly arrangement just described makes it possible readily to dissassemble those operating parts of the super-structure which must periodically be sterilized.

As shown in Figure 6, the knife edge of the slide plate 40 extends through an opening 82 formed in the front wall 57 of the hopper and into abutment with the recessed wall of the vertical member 75. The space X between the knife edge and the inclined surface 78 constitutes the actual measuring chamber. It will be apparent that when the slide plate 40 is withdrawn upwardly relative to the hopper, powder from the hopper will flow through the opening 82 down on to the inclined surface 78. The operating cycle of the machine is such that the slide plate is so withdrawn for a period of time sufficient to assure a complete filling of the space X under the vibration imparted to the super-structure by the vibration-producing means. The slide plate is then moved downwardly to the illustrated position thereby closing off the measuring chamber X from the hopper. The discharge of the powder from the measuring chamber will be described with specific reference to Figure 20 hereinbelow.

Figures 12, 13, 14, 15, 16, 17:
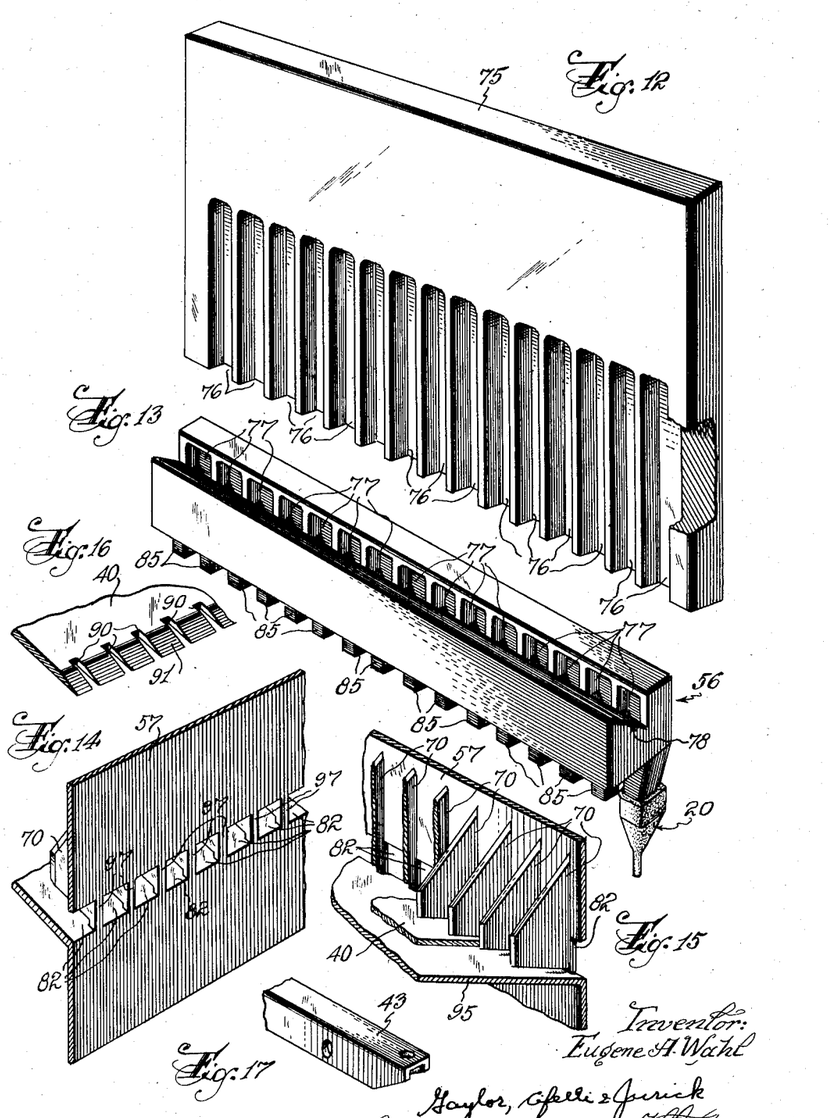
Figure 12 is a perspective view showing the vertical plate disposed at the hopper front, said plate having a fluted rear surface forming a portion of the individual measuring chambers.
Figure 13 is a perspective view of the funnel and bottom gate assembly.
Figure 14 is a fragmentary perspective view showing the front of the hopper wall.
Figure 15 is a similar view showing the rear of the hopper wall.
Figure 16 is a fragmentary perspective view showing the tapered and serrated edge of the slide plate.
Figure 17 is a fragmentary perspective view of the cross bar that serves as a means for moving the funnel assembly up and down to thereby close and open, respectively, the measuring chambers.

I have already described the construction of the funnel and bottom gate assembly with reference to Figure 13. With continued reference to Figure 13 it is pointed out that the various chambers 77 are individually in communication with the tapered extensions 85 each such extension carrying a funnel 20. These tapered extensions 85 are also clearly shown in Figure 2 and they serve as more or less individual rectangular chutes for directing the flow of powder from the measuring chamber into the individual funnels. It may be well here to refer to Figure 7 which is a fragmentary horizontal sectional view taken along the line E—E of Figure 2. Here are clearly shown the tapered extensions or chutes 85 and the funnels 20 positioned over the conveyor belt 22 and adjacent to the resilient bumper rail 26. The bottles 21 are shown in the loading rack preparatory for movement on to the belt and into bottle-filling registry with the individual funnels.

Figure 7:
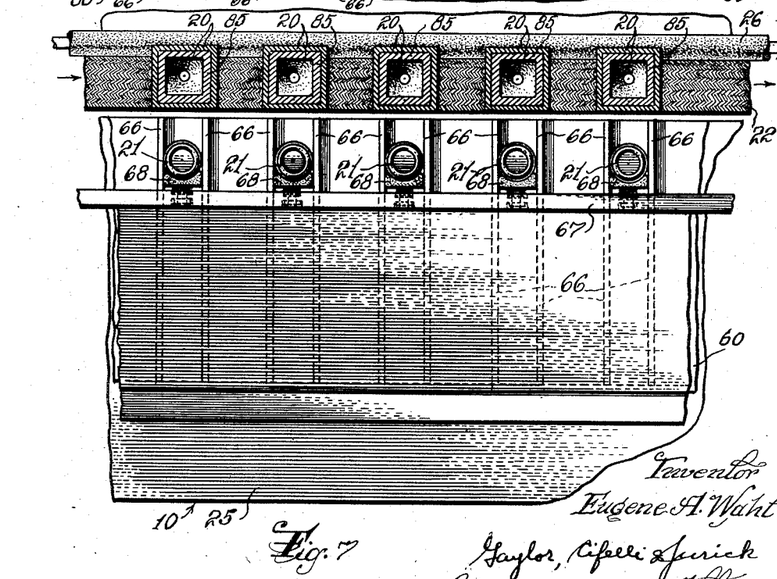
Figure 7 is a fragmentary sectional view taken along the line E—E of Figure 2.
Figure 8:
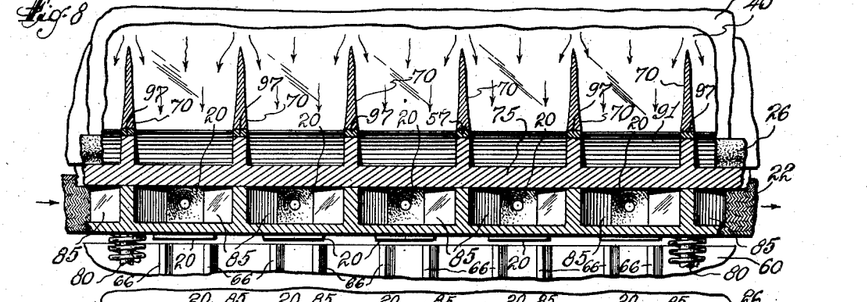
Figure 8 is a similar view taken along the line F—F of Figure 2.

Figure 8 which is a horizontal sectional view taken along the line F—F of Figure 2 shows the tapered chutes 85 at a somewhat higher level than that shown in Figure 7. The level of the sectional view, Figure 8, is such that it shows the partition wall 70 extending from the front wall 57 of the hopper and disposed at the lower hopper end, see also Figures 6 and 15. The arrows indicate the flow of the powder along the inclined slide plate 40, said slide plate 40 being provided with a plurality of recesses 90, see Figure 11, so as to permit the knife edges 91 of the slide plate to abut the inner surface of the front wall 57 of the hopper.

In order to facilitate a proper understanding of the construction and assembly of the lower portion of the hopper, reference is again made to Figures 14, 15 and 16. Figure 14 is looking from the front of the machine towards the hopper whereas Figure 15 is a similar view looking from the rear of the machine. It will be noted that the front wall 57 of the hopper is provided with a rearwardly sloping wall 95 and with a plurality of openings 82. The partition members 70, extending from the front hopper wall 57, are disposed between such openings and the slide plate 40, see Figure 16, slides along the sloping surface 95 with the recesses 90 alined with the partitions 70. As shown in Figure 15, the bottom edges of the partitions 70 are spaced from the sloping wall 95 a distance slightly greater than the thickness of the slide plate 40. From this, it will be apparent that with the recesses 90, in the knife edge of the slide plate 40, alined with the joining fins 97, in the hopper wall 57, the knife edges of the slide plate will protrude outwardly of the wall 57 when such plate is moved downwardly along the inclined surface 95. For purposes of clarity, in the Figure 1 illustration I refer to the sloping bottom surface of the hopper by the reference numeral 31. Having now given a detailed description of the assembly shown in Figures 14–16 it will be apparent that the bottom wall of the hopper is constituted by the sloping wall 95 extending from the front hopper wall 57. In order to promote a clearer understanding of the construction, reference is again made to Figure 6 which clearly shows the bottom wall of the hopper 95 sloping upwardly from the lower portion of the hopper front wall 57. The openings 82, shown in Figure 6, have a generally rectangular shape as clearly shown in Figure 14.

I have already explained that the chamber X, Figure 6, constitutes the measuring chamber and that the volume of such chamber can be varied by movement of the hopper up or down in the super-structure end frames. With continued reference to Figure 6, it is apparent that when the hopper is raised the operating plane of the slide plate 40 is raised with respect to the inclined surface 78 of the horizontal bar 113, thereby increasing the effective volume of the chamber X and all similar chambers. Conversely, a lowering of the hopper will bring the operating plane of the slide plate closer to the inclined surface 78, thereby decreasing the effective volume of the measuring chambers. Such adjustment of the volumetric capacity of the individual measuring chambers is accomplished by rotation of the two adjusting screws 81, see Figure 2, and the specific structural arrangement involved will now be described.

As shown in the enlarged, fragmentary view of Figure 18, the upper portion of the front wall 57 of the hopper is secured, as by welding, to a relatively heavy plate 100, extending across the vertical hopper wall. The adjusting screw 81 is provided with a head 101 that is freely rotatable within an undercut keyway formed in the upper side edge of the plate 100. Each such adjusting screw 81 operates in a threaded hole formed in a top plate 102, which plate is rigidly secured to the super-structure end frames 41 as by the screws 103. It will be clear that if the thumb screw 45 is loosened and the adjusting screw 81 is rotated in a clockwise direction (looking downwardly) the supporting plate 100 and hopper wall 57 will be moved downwardly relative to the vertical member 75. Such relative movement between the hopper and the member 75 increases the capacity of the measuring chamber.

Figure 11:
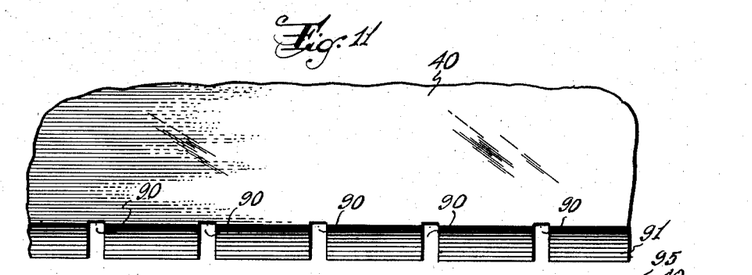
Figure 11 is a fragmentary top plan view of the slide plate which is operated to open and close the opening between the hopper and the measuring chambers.

While I have just described the single measuring chamber X, shown in Figure 6, it should be borne in mind that the machine is provided with a plurality of such chambers each associated with a funnel and the individual knife edge serrations of the slide plate 40, see Figures 11 and 16, operate as gates to either open or close the chambers relative to the hopper. In summary, then, the powder is stored in the general hopper and is fed into the measuring chambers by the action of gravity and vibration when the slide plate 40 is in the withdrawn position. The operating cycle of the machine is so set as to assure a complete filling of the measuring chambers before the slide plate is moved to the forward position, thereby closing-off the measuring chambers from the hopper. After the measuring chambers are closed-off from the hopper, the crossbar 43 is lowered, thereby resulting in a separation between the inclined surface 78 and the mating surface formed in the lower edge of the vertical member 75. This permits the powder to flow out of the measuring chambers into the associated dispensing chambers 110.

Figure 9:
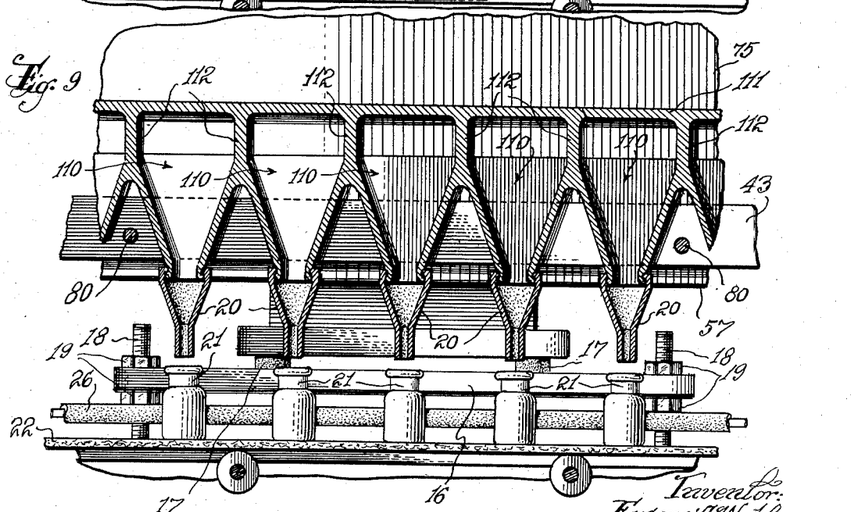
Figure 9 is a fragmentary, vertical sectional view taken along the line G—G of Figure 6.

A better understanding of the dispensing chambers can be had by reference to Figure 9 which is a fragmentary, vertical section taken along the line G—G of Figure 6. Here is shown the top wall 111 of the dispensing chambers, such wall having a plurality of downwardly depending partitions 112 each of which branches out to form the tapered side walls of the individual dispensing chambers 110. It will now be clear that the powder discharged from the individual measuring chambers flows downwardly through the individual dispensing chambers and funnels and into the bottles 21. Figure 9 also clearly shows the horizontal crossbar 43 and the laterally-extending pins 80 secured thereto. These pins extend toward the front of the machine between the dispensing chambers and are employed to removably secure the measuring chamber and bottom gate assembly to the super-structure by the spring-backed thumb nuts 46 shown in Figure 6. Further, Figure 9 also shows the front surface of the vertical member 75, said member having a sloping lower end which mates closely with the cooperating sloping surface 78 formed in the member 113, see also Figure 6. These cooperating sloping surfaces form what may be termed a lower gate controlling the flow of the powder from the measuring chambers into the dispensing chambers and from thence through the funnels into the bottles.

Figure 10:
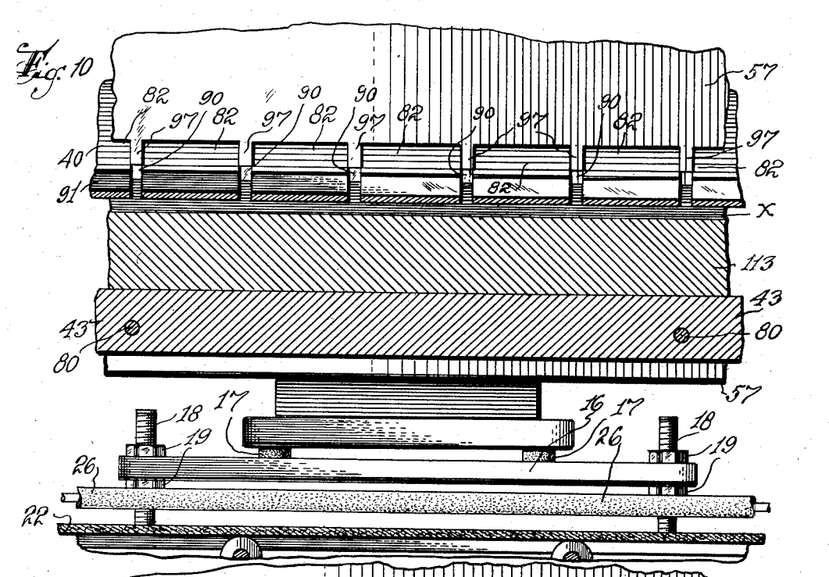
Figure 10 is a fragmentary, vertical sectional view taken along the line H—H of Figure 6 and including the vibrator base.

Figure 10, which is a view similar to that of Figure 9 but taken along the line H—H of Figure 6, is presented to further illustrate the arrangement of the various parts at the lower end of the hopper. Here again, are visible the crossbar 43, the sloping surface of the member 113 and the upper and lower portions of the front hopper wall 57. The plane through which Figure 10 is taken exposes to view the slide plate 40 and the measuring chambers X, said slide plate constituting what may be termed an upper gate controlling the flow of the powder from the hopper into the measuring chambers.

Having now described the construction of the various individual components and the co-acting assembly thereof in the machine, a thorough understanding of the operation of the upper and lower gates and the flow of the powder will be had by reference to Figures 19 and 20 which are fragmentary, transverse sectional views of the lower portion of the super-structure. These figures clearly show the powder in the lower portion of the hopper 30; the front wall 57 of the hopper; one of the channels 76 in the vertical member 75; the sloping lower end of the member 75, which end is adapted for precise surface contact with the sloping surface 78 of the member 113; the crossbar 43; the dispensing chamber 110 formed by the forward wall of the member 113, the top wall 111 and front wall 115; the funnel 20 carried by the dispensing chamber; and a portion of the tie plate 13 which supports the entire super-structure on the electro-magnetic vibrator. In Figure 19 the slide plate 40 is shown in its retracted position whereby powder flows from the hopper into the measuring chamber X. During this portion of the operating cycle the lower gate is closed, that is, the lower, sloping end of the vertical member 75 abuts the sloping surface 78. It may here be pointed out that these surfaces are ground to a close tolerance so that even exceedingly fine powder will not pass therebetween when the surfaces are in abutting relationship. Further, during this part of the operating cycle the air in the cylinders 42 (see Figure 1) is maintained under pressure so as to retain these surfaces under pressure contact. In a short time interval, the powder will completely fill the measuring chambers after which the slide plate 40 is moved forwardly to the position shown in Figure 20, thereby closing-off the hopper from the measuring chambers. The vibration of the entire super-structure is maintained and immediately the crossbar 43 is lowered, thereby opening the measuring chambers whereby the powder is discharged through the dispensing chamber into the bottle. The crossbar 43 is then raised, thereby again closing-off the measuring chambers from the discharge chambers 110 after which the slide plate 40 is again moved to the retracted position shown in Figure 19. When the crossbar 43 is raised, power is applied to the electric motor to drive the conveyor belt, thereby moving the filled bottles out of range of all the funnels. During the just-described operating cycle of the machine, the operator has had sufficient time to load the bottle-feed rack with new bottles. When the conveyor belt stops, the rack is moved toward the funnels to thereby position the new series of bottles in the bottle-filling position on the belt.

I have already pointed out that the volumetric capacity of the measuring chambers can be adjusted by rotation of the adjusting screws 81 disposed at the sides of the hopper, see Figures 1 and 2. Figure 21 shows the relative position of the parts when the capacity of the measuring chambers has been increased above that shown in the comparable Figure 19. Here, the entire hopper has been raised relative to the end frames of the super-structure and relative to the horizontal bar 113. As has been explained with reference to Figure 18, the vertical member 75 is stationary and remains in its initial position. The net effect, therefore, of raising the hopper relative to the bar 113, is to raise the operating plane of the slide plate 40 relative to the bottom of the measuring chamber (said bottom being constituted by the sloping surface 78 of the member 113) which, obviously, increases the volumetric capacity of each measuring chamber.

Figure 23:
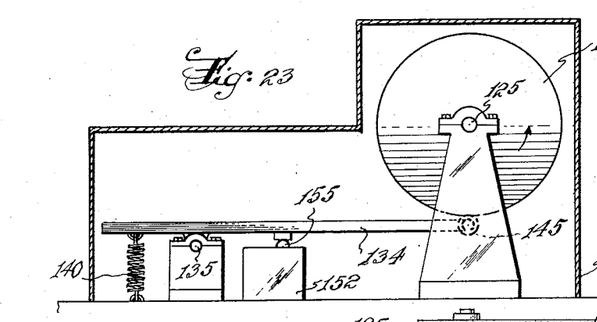
Figure 23 is a side view of the timing mechanism which controls the various related operations of the machine.
Figures 24, 25:
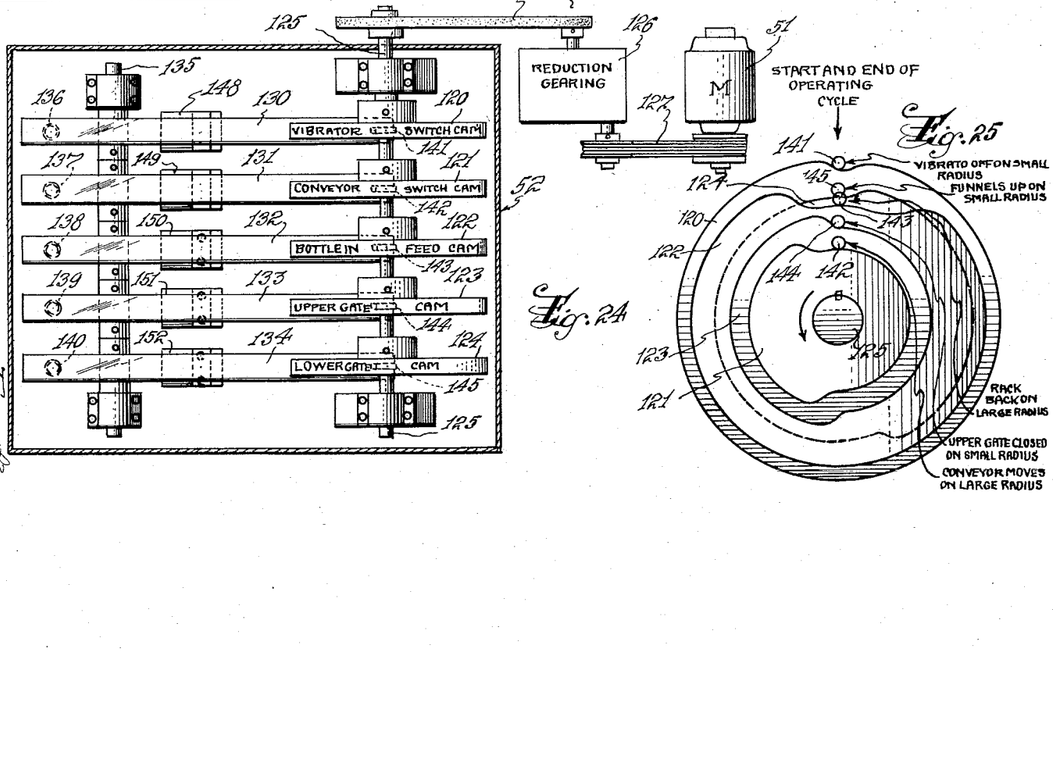
Figure 24 is a top view of such timing mechanism.
Figure 25 is a diagrammatic illustration showing the position of the various timing cams at the start of the machine operating cycle.

Having now given a detailed description of the structural elements of my machine, I proceed to a description of the timing mechanism with specific reference to Figures 23 and 24 which are side elevation and top plan views, respectively, of the mechanism enclosed within the housing 52, see also Figure 1. The timing mechanism comprises a plurality of cams 120—124 secured to a shaft 125 which is driven by the motor 51 through a reducing gearing 126 and associated drive belts 127, 128. Associated with each cam are the individual levers 130—134, each lever being pivotally mounted on a fulcrum shaft 135 and spring-biased in a counter-clockwise direction by associated coiled springs 136—140. When so biased, the rollers 141—144 are maintained in rolling contact with the peripheral surface of the associated cams. The pivoted levers 130—134 each rotate about the fulcrum shaft as the associated rollers follow the specific contour of the controlling cam. Such pivotal movements of the levers control the operation of suitable electrical switches or air valves which, in turn, control the timed-operation of the various machine parts. More specifically, the lever 130, operated by the Vibrator Switch Cam 120, controls the opening and closing of a normally-open micro-switch 148; lever 131, operated by the Conveyor Switch Cam 121, controls the opening and closing of a similar micro-switch 149; the lever 132, operated by the Bottle In-Feed Cam 122, controls the operation of a three-way air valve 150 which controls the flow of air into the air cylinders 62 (see Figures 1 and 5), for forward and reverse movement of the bottle-feed rack; lever 133, operated by the Upper Gate Cam 123, controls the operation of a similar three-way air valve 151 which controls the flow of air into the air cylinders 35 (see Figure 1) for the forward and reverse movement of the slide plate 40; and lever 134, operated by the Lower Gate Cam 134, controls the operation of a similar, three-way air valve 152 which controls the flow of air into the air cylinders 42 (see Figures 1 and 2) for lowering and raising the measuring-dispensing chamber assembly. The three-way air valves 150, 151, 152 are of conventional construction and those skilled in this art will understand that when the associated lever, such as lever 135 of Figure 23, depresses the valve stems 155 air is admitted into the associated air cylinder so as to drive the piston in one direction, whereas when the lever is moved away from the valve stem, air is admitted into the air cylinder so as to drive the piston in the reverse direction. It will now be clear that all of the cams rotate in unison and that by providing suitable cam contours the switches 148 and 149 and the air valves 150—152 will operate in a predetermined timed sequence.

Figure 26:
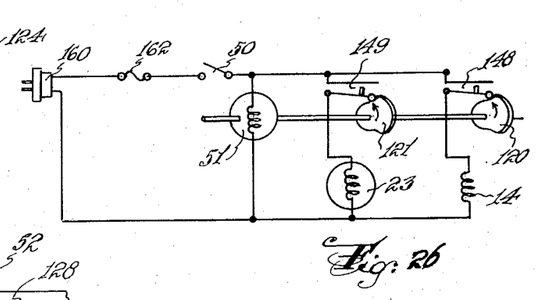
Figure 26 is an electrical circuit diagram of the machine.

The air valves 150—152, of the timing mechanism, are, of course, connected to a suitable source of compressed air and to the associated air cylinders by suitable, flexible hoses, whereas the micro-switches 148, 149 are connected into an electrical circuit as shown in Figure 26. Here is shown a conventional plug 160 for supplying electrical power to the machine from a conventional 60 cycle power line through a fuse 161. Closure of the main switch 50, which is located on the machine at a convenient point within the reach of the operator (as shown in Figure 1), results in the energization of the motor 51 that drives the timing cams, two such cams, 120 and 121, being shown in the wiring diagram. Rotation of the cam 121 causes a closure of the contacts of the associated micro-switch 149, thereby energizing the solenoid 14 of the electromagnetic vibrator (see also Figure 1) resulting in a vibration of the entire super-structure. Some time after the closure of the micro-switch 148, the cam 121 closes the contacts of the micro-switch 149, thereby energizing the belt-drive motor 23. It is here pointed out that in the wiring diagram of Figure 26 the cams and micro-switches are shown only diagrammatically. Actually, the switch 148 is closed a few seconds after closure of the main switch 50, by the operator, and such switch remains closed until the completion of the machine operating cycle. Consequently, the super-structure is vibrated substantially continuously, it being assumed that the timing mechanism continues to run as long as the main switch 50 remains closed. On the other hand, the switch 149 (which controls the movement of the conveyor belt) is closed only after the bottles have been filled with powder and is opened after the filled bottles have been moved out of range of all the funnels. Still further, since the cams controlling the flow of air to the various air cylinders are only mechanically linked to the controlling air valves, these particular cams are not shown in the circuit diagram.

A complete operating cycle of the machine will now be described with particular reference to Figure 25 which is a side elevation of the cams and showing the individual cam contours in proper operating relationship. For purposes of clarity, the rollers 141—144 are shown positioned at the top of cams rather than in the preferred practical position as shown in Figure 24. In Figure 25, the cams are shown in a position representing the beginning of an operating cycle and it will be noted that all cams revolve in a counter-clockwise direction. It will be assumed the hopper is substantially filled with powder and that the measuring chambers are filled to capacity. The sequence of operations, then, is as follows:

(1) The roller 141 is raised by the cam 120, thereby closing the associated micro-switch to energize the electromagnetic vibrator. As is apparent, the vibrator is energized throughout substantially the entire operating cycle and, consequently, the super-structure of the machine is continuously vibrated except for a very short period at the beginning and end of each cycle.

(2) The roller 145 is raised by the lobe on cam 124 shortly after the start of the cycle. Such roller movement sets the associated three-way air valve so that the pistons of the air cylinders, controlling the vertical movement of the funnels, move the funnels downwardly into the bottle-filling position. Such downward movement of the funnels and associated mechanism results in a discharge of the powder from the measuring chambers, through the discharge chambers and funnels into the bottles.

(3) Shortly after the funnels have been lowered into the bottle-filling position, the roller 143 is raised on the large radius portion of the associated cam 122. This operates the associated air valve in such manner that air pressure is admitted into the air cylinders, controlling the sliding movement of the bottle-feed rack so as to move the rack away from the funnels and to its initial position so that the operator can insert another series of bottles thereinto. It will be noted that the rack is retained in its forward position while the funnels are being lowered and for a short time thereafter. When the rack is in the forward position, it presses the bottles against the resilient, rear bumper rail, thereby holding the bottles firmly in true, alined vertical position as the funnels descend, thus, any slight misalinement between the bottle opening and the end of the funnel will not result in a tipping of the bottle. Once the funnels are inserted into the bottles, the rack is removed to its original bottle-loading position.

(4) During the above 3 phases of the operating cycle, the rollers 144 and 142 ride on the small radius portions of their respective cams and, consequently, the upper gate or slide plate remains closed and the conveyor belt remains stationary.

(5) Just prior to the completion of one half revolution by the cams, the roller 145 will return to the small radius section of its cam 124, whereby the funnels will be raised. This closes off the lower gate, that is, the measuring chambers are closed-off from the discharge chambers and funnels.

(6) Shortly after the funnels are raised, the roller 144 will ride on the large radius section of the cam 123, thereby actuating the associated air valves to admit air under pressure to the air cylinders, controlling the position of the slide plate, in such direction that the slide plate is moved outwardly of the hopper. Such movement of the slide plate which, actually, constitutes the upper gate of the assembly, opens the measuring chambers to the hopper whereby the chambers are again filled to capacity with powder. It will be noted that the slide plate is not returned to the closed position until just prior to the completion of the operating cycle. Further, and quite obviously, since the time period during which the measuring chambers are open to the hopper is identical for each operating cycle, and since the entire super-structure is vibrated at a constant amplitude during such period, the powder in the measuring chambers will always be compacted to a uniform extent throughout every cycle, thereby assuring a precise, constant amount of powder discharged into each and every bottle.

(7) Shortly after the closure of the lower gate and raising of the funnels, the roller 142 will ride on the large radius portion of the cam 121, thereby closing the associated micro-switch and energizing the belt-drive motor, whereby the bottles which have been filled are moved beyond the range of all the funnels. It will be apparent from the shape of the cam 121 that the roller 142 will return to the small radius section of the cam substantially before the completion of the operating cycle. The linear speed of the belt is pre-determined so that the filled bottles are moved beyond the funnels before the roller 142 again opens the associated micro-switch to thereby stop the belt.

(8) After the belt has stopped, the lobe on the roller 143 returns to the small radius section of the cam 122, thereby actuating the associated air valve to produce a forward movement of the rack, that is, toward the funnels, thereby positioning the second series of bottles on the belt and into alinement with the individual funnels in bottle-filling position. It should be noted that during this part of the cycle the funnels remain in the raised position and the upper gate remains open.

(9) The cams complete a revolution and return to the position shown in Figure 25, the roller 141 opening the switch to de-energize the vibrator.

It is again pointed out that the cam arrangement shown in Figure 25 is diagrammatic and, therefore, not specifically related to the positonal arrangement of the cams shown in Figures 23 and 24. From a practical viewpoint it is preferable to have the air-valve-operating cams disposed adjacent to each other as shown in Figure 24, but it is believed the diagrammatic showing of the cams in Figure 25 facilitates the description and understanding of the machine operating cycle. Also, it is not essential that the vibration of the super-structure be discontinued at the end of each operating cycle and the cam 120 may well have a uniform radius. However, in the arrangement just described, the machine will continue to operate as long as the main control switch 50 (see Figures 1 and 26) is closed. If, therefore, the operator wishes to shut off the machine for any reason, it is preferable that this be done when the cams are in the position shown in Figure 25, and such position of the cams will be made apparent to the operator when the illustrated cam 120 brings about a stoppage of the super-structure vibration.

While I prefer to design the machine for continuous automatic operation, as described, it will be apparent that a discontinuous type of operation may be provided by inserting a conventional single-revolution clutch between the cam shaft 125, Figure 24, and the reduction gearing 126. In such arrangement, the closure of the main operating switch will result in a single revolution of the cams after which the machine will stop. Each operating cycle, therefore, must be initiated by a closure of the main switch by the operator. Also, the rack which moves the next series of bottles on to the belt into the bottle-filling position need not be automatically operated by the air cylinders 62 shown in Figures 1 and 5. Elimination of these air cylinders will require the operator manually to move the rack to its forward and return positions. It is believed these variations, designed to meet specific operational requirements, can readily be made by those skilled in this art.

With respect to the continuously automatic arrangement shown in the drawings, I here wish to point out that the operating speed is set so that the cams will complete a full revolution in 10 seconds and that the time during which the bottle-feed rack is in its normal position is approximately 8 seconds, which time is ample for the operator to position a plurality of bottles into proper position in the rack. The number of funnels incorporated in a given machine will, of course, involve a consideration of the time during which the rack is in its normal position. I have found that the above timing-cycle will support a 20 funnel machine without imposing undue hardship on the operator.

A powder-filling machine made as herein described affords numerous advantages over prior machines of this class, specifically:

(1) The machine is of simple construction requiring a minimum of maintenance.

(2) The vital operating components, particularly those coming into contact with the powder, are of dust-tight construction.

(3) The operating accuracy of the machine far exceeds that of present machines. By actual test, my machine will fill the bottles with an accuracy of 2% on sticky powders and better than 1% on free-flowing powders.

(4) Those parts of the machine coming into contact with the powder are easily dismantled and reassembled for purposes of periodic sterilization.

(5) The machine is readily adjusted to compensate for density variations among powders of different batches and such adjustment is possible over a wide range.

(6) The machine can be conditioned quickly and accurately to discharge a required, measured amount of powder into the bottles, from 20 milligrams to 5 grams, or more, by merely replacing the measuring chambers. In actual practice, a given set of measuring chambers are adapted for a 10 to 1 variation in volumetric capacity by means of the adjustment screws.

(7) The machine will operate uniformly with a wide variety of powders from free-flowing to sticky. The vibration of the super-structure at an amplitude of approximately .020 inch results in a reliable movement of even sticky amorphous powders having the consistency of wet clay.

Having now described my invention in detail in accordance with the patent statutes, various changes and modifications will suggest themselves to those skilled in this art and it is intended that such changes and modifications shall fall within the spirit and scope of the invention as recited in the following claims.

I claim:

1. Apparatus for dispensing measured quantities of powder or the like material comprising a storage hopper for the material and having an opening in the bottom; a measuring chamber disposed in fixed position below the hopper opening and having an upper end normally communicating with the hopper through the hopper opening; a vertically-movable member having a sloping wall forming the bottom of the measuring chamber, said member being movable between an uppermost position to close the bottom of the measuring chamber and to a lowermost position to space the sloping wall from a side wall of the measuring chamber thereby forming a chamber-discharge opening; a slidable plate movable between a chamber-closing position where said plate closes the upper end of the chamber from the hopper and a chamber-opening position permitting flow of material from the hopper into the chamber; means alternately moving the said slidable plate from chamber-closing to chamber-opening position and correspondingly moving the said vertically-movable member from lowermost to uppermost position; and means continuously vibrating the hopper and measuring chamber, said means being operatively disassociated from the means moving the said slide plate and vertically movable member.

2. The invention as recited in claim 1, wherein the measuring chamber is offset relative to the bottom of the hopper and said slide plate is movable along a wall of the hopper.

3. A powder-filling machine comprising a base member; a normally-stationary conveyor belt carried by the base member; a super-structure disposed over and spaced from the base member; a storage hopper for powder carried by the super-structure; a measuring chamber carried by the super-structure and communicating with the hopper, said chamber having a discharge opening over the belt; a first closure means operative to close-off the measuring chamber from the hopper; a second closure means operative to close-off the discharge opening of the chamber; means controlling the operation of the said first and second closure means to alternately permit the flow of powder from the hopper into the measuring chamber and from the measuring chamber through its discharge opening; means for positioning a bottle on to the belt and in bottle-filling-alinement with the discharge opening of the chamber, automatic means to move the belt after the said second closure means has closed the discharge opening of the measuring chamber, and power means continuously vibrating the super-structure at a positive, substantially-constant amplitude and frequency during the entire time that powder flows into and out of the measuring chamber.

4. The invention as recited in claim 3, wherein the said power means vibrating the super-structure comprises electromagnetic means carried by the base member and wherein the super-structure is supported solely by the said electro-magnetic means, 5. The invention as recited in claim 3, including means adjustable to alter the spacing between the super-structure and the base member.

6. The invention as recited in claim 3, including adjustable means to vary the volumetric content of the measuring chamber.

7. The invention as recited in claim 3, wherein the means for positioning a bottle on to the belt comprises a rack slidably carried by the base member and including means for supporting a bottle in upright position, said rack being movable from a first position spaced laterally of the belt to a second position overlying the belt.

8. A powder-filling machine comprising a base member; a conveyor belt movable along the upper surface of the base member; an electric motor adapted when energized to move the belt; mechanical vibration-producing means supported on the base member; a super-structure carried by the vibration-producing means; a storage hopper for powder carried by the super-structure; a plurality of measuring chambers carried by the super-structure and communicating with the hopper; an upper gate movable between two positions to open and close-off the measuring chambers from the hopper; a first fluid-pressure-actuated means for moving the upper gate; individual discharge chambers communicating with the measuring chambers, said discharge chambers including funnel-ends spaced above and longitudinally of the belt; a lower gate movable between two positions to open and close-off the measuring chambers from the discharge chambers; a second fluid-pressure-actuated means for moving the lower gate; a bottle rack carried by the base member and normally spaced laterally of the rack, said rack being adapted to receive a plurality of bottles in vertical position and spaced to correspond to the spacing of the said funnels and said rack being adapted for movement over the belt to thereby position the bottles under individual funnels; timing means including valves controlling the flow of fluid from a source to the two said fluid-pressure-actuated means to close-off the upper gate when the lower gate is open; and a switch actuated by the timing means to energize the electric motor for a portion of the time during which the lower gate closes-off the measuring chambers from the discharge chambers.

9. The invention as recited in claim 8, including adjustable means to vary the position of the super-structure relative to the top of the base member and adjustable means simultaneously to vary the volumetric capacity of the measuring chambers.

10. The invention as recited in claim 8, wherein the said hopper includes a sloping lower wall joined to a substantially vertical wall having a series of openings therein, and the upper gate comprises a slide-plate movable along the sloping wall, said slide-plate having a plurality of knife-edge fingers adapted to extend through the said openings when the slide-plate is in the position closing-off the measuring chambers from the hopper.

11. The invention as recited in claim 10, including a third fluid-pressure-actuated means for moving the said rack toward and away from the funnels, and including valve means operated by the timing means to control the flow of fluid from a source to the third fluid-pressure-actuated means so as to move the rack toward the funnels when the lower gate is closed.

12. The invention as recited in claim 11, including a plurality of cams secured to a shaft and disposed within the base member; a motor adapted when energized to rotate said shaft; air-valves operated by certain cams to control the flow of fluid from a source to the three said fluid-pressure-actuated means; switches controlled by others of said cams to connect the two said motors to a source of electrical power.

13. A powder-filling machine comprising a base member; a conveyor belt movable along the upper surface of the base member; an electric motor carried by the base member and adapted when energized to move the belt; an electro-magnetic vibrator secured to the top surface of the base member; means adjustable to vary the spacing of the vibrator from the top surface of the base member; a pair of vertically-extending end frames secured to the vibrator; a vertical plate secured between the side frames, said plate having a plurality of parallel, vertical channels extending to the lower end of the plate; a hopper for powder, said hopper having a front wall overlying the channels in the vertical plate and including a plurality of openings registering with said channels, and a sloping bottom wall joined to the front wall at a point below the said openings; a slide-plate movable along the sloping hopper wall and including a plurality of knife edges adapted to extend through the openings in the front hopper wall into abutment with the base of the channels in the vertical plate; a crossbar spaced from and extending along the bottom end of the vertical plate; a horizontal bar disposed between the end frames and supported by the crossbar, said horizontal bar having a sloping top surface spaced from the slide-plate and said horizontal bar having a thickness substantially equal to that of the vertical plate and normally abutting the lower end of the vertical plate, thereby closing-off the lower ends of the channels in said vertical plate; means carried by the horizontal bar and forming a plurality of discharge chambers corresponding to the said channels; a vertically-disposed funnel secured to each discharge chamber, said funnels having ends spaced above the belt; fluid-pressure-actuated means to move the said slide-plate downwardly so that the knife edges thereof abut the base of the associated channels, thereby preventing the flow of powder from the hopper into the lower portion of each channel; fluid-pressure-actuated means to move the said crossbar downwardly thereby spacing the said horizontal bar from the lower end of the vertical plate and permitting powder to flow from the lower portion of each channel through the associated discharge opening and funnel; a bottle rack carried by the base member and normally spaced laterally of the belt, said rack including means supporting a plurality of bottles in vertical position and in alinement with the said funnels, and fluid-pressure-actuated means to move the rack over the belt to position the bottles under the funnels.

14. The invention as recited in claim 13, wherein the sloping surface of the hopper is adjustable vertically of said end frames.

15. Apparatus for use in a machine for filling bottles with powder, said apparatus comprising rigid supporting means; a hopper for powder carried by the supporting means; a measuring chamber of predetermined volumetric capacity carried by the supporting means, said measuring chamber having an intake opening communicating with the hopper and a discharge opening; closure means to alternately close and open the intake opening of the measuring chamber; means to raise and lower the measuring chamber relative to the hopper; means effective when the measuring chamber is in the raised position to close the discharge opening thereof and effective when the chamber is in the lowered position to open the discharge opening; means controlling the movement of the said closure means to open the intake opening of the measuring chamber when the chamber is in the raised position; and means to vibrate the said supporting means.

16. The invention as recited in claim 15, including adjustable means to vary the volumetric capacity of the measuring chamber.

17. A hopper and measuring chamber assembly for a powder-filling machine, said assembly comprising a hopper having a sloping bottom wall; means forming a plurality of individual openings in the bottom wall of the hopper; individual measuring chambers disposed below the sloping hopper wall, each chamber communicating with the hopper through the said openings; a slide-plate movable along the sloping hopper wall and including a plurality of knife-edges adapted to extend through the said openings to close-off the measuring chambers from the hopper; a horizontal bar having a sloping upper surface forming the bottom of each measuring chamber; a plurality of dispensing chambers carried by the horizontal bar and alined with the measuring chambers; and means to lower the horizontal bar relative to the slide-plate, such lowering of the bar placing the individual measuring chambers in communication with the associated dispensing chambers.

References Cited in the file of this patent

UNITED STATES PATENTS

| | | |
|---|---|---|
| 534,082 | Reeder | Feb. 12, 1895 |
| 1,266,706 | Nickle | May 21, 1918 |
| 2,116,105 | Eaton | May 3, 1938 |
| 2,333,790 | Howard | Nov. 9, 1943 |
| 2,393,382 | Kerr | Jan. 22, 1946 |
| 2,649,224 | Bandet | Aug. 18, 1953 |